United States Patent [19]

Neufeldt

[11] 4,059,307
[45] Nov. 22, 1977

[54] VEHICLE TAILGATE ASSEMBLY

[76] Inventor: Jacob J. Neufeldt, Box 597, Lethbridge, Alberta, Canada, T1J 3Z4

[21] Appl. No.: 723,910

[22] Filed: Sept. 16, 1976

[30] Foreign Application Priority Data

Oct. 1, 1975 Canada .................................. 236797

[51] Int. Cl.² ............................................ B60P 1/26
[52] U.S. Cl. ............................ 298/23 R; 105/261 A; 214/307
[58] Field of Search ................ 298/23 R, 23 M, 23 A, 298/22 R; 105/280, 261 A, 276, 277; 214/307

[56] References Cited

U.S. PATENT DOCUMENTS

| 2,941,682 | 6/1960 | Keys | 298/23 R X |
| 2,943,753 | 7/1960 | Keys | 298/23 R X |
| 2,943,754 | 7/1960 | Keys | 298/23 R X |

Primary Examiner—Robert J. Spar
Assistant Examiner—George F. Abraham
Attorney, Agent, or Firm—Alex E. MacRae & Company

[57] ABSTRACT

The specification describes a tailgate assembly for a tiltable body of a truck or the like, the assembly being movable between opened and closed positions in response to the angular displacement of the dump body and including first and second gate members releasably secured to a rear wall of the vehicle and resilient means biasing the gate members to the opened position in such a manner that upon release of the gate members the assembly will move to the opened position.

8 Claims, 5 Drawing Figures

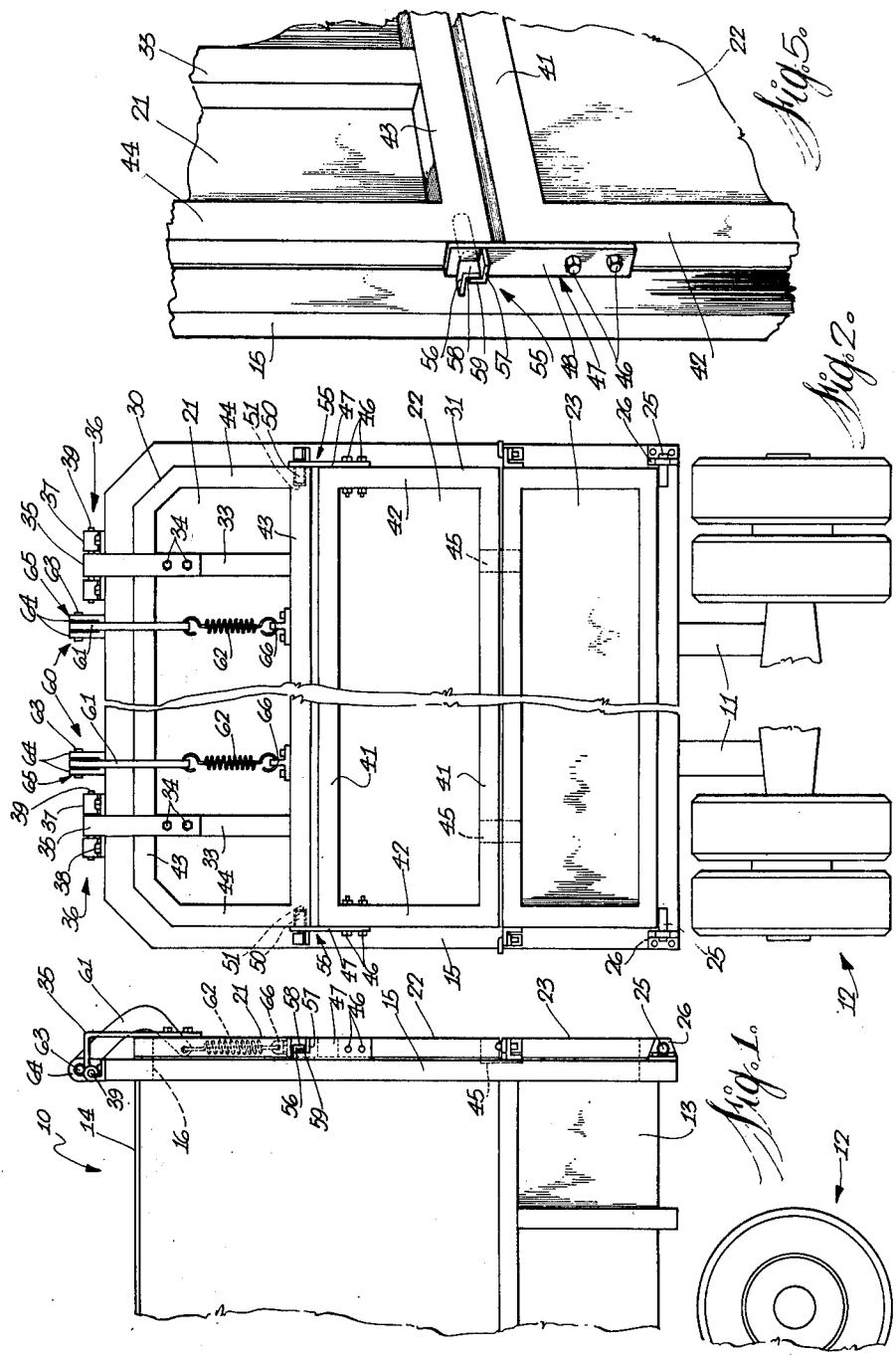

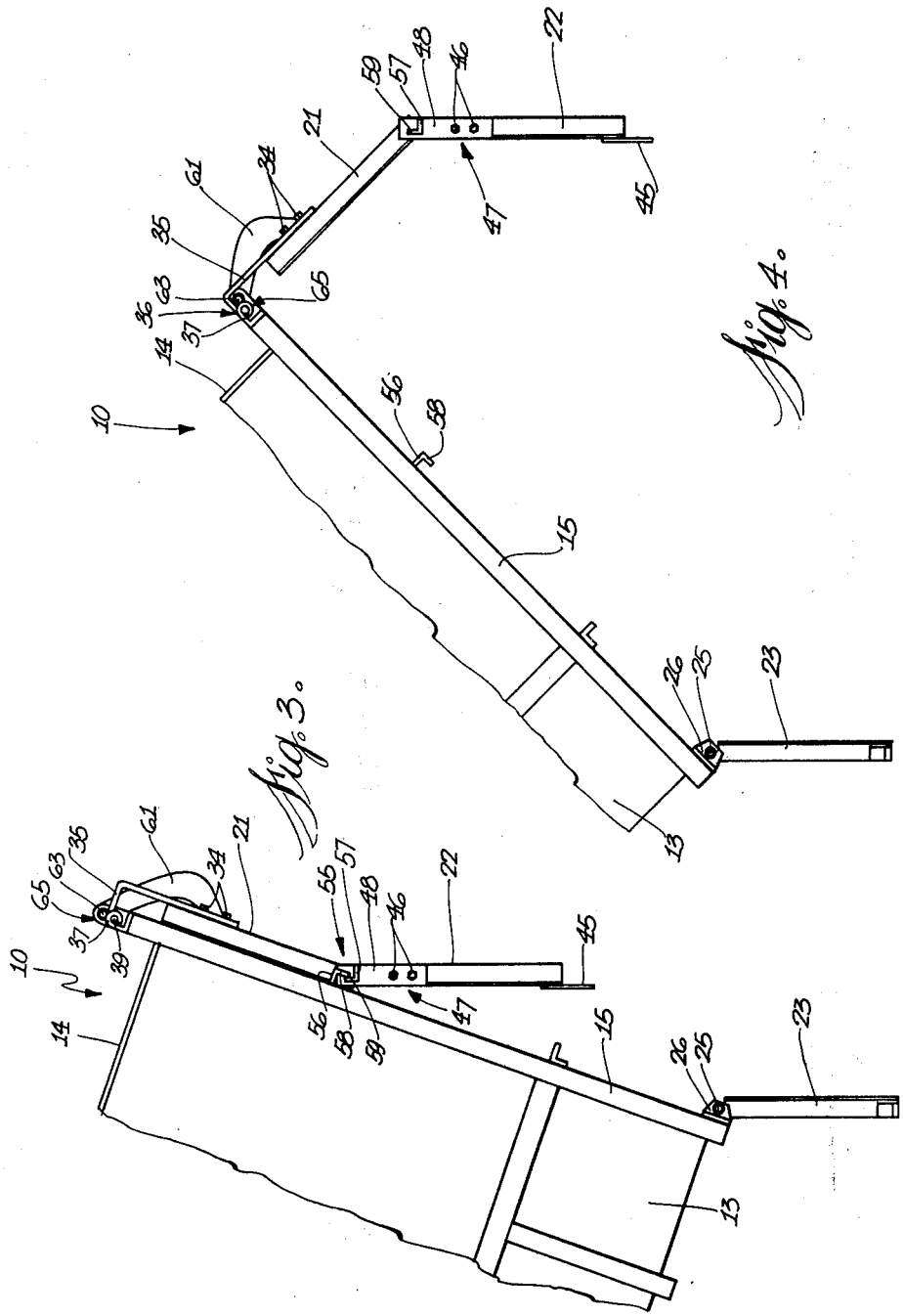

VEHICLE TAILGATE ASSEMBLY

INTRODUCTION AND DISCUSSION OF PRIOR ART

This invention relates to a tailgate assembly of a dump truck and, particularly, to a tailgate assembly which is responsive to the angular orientation of the dump body to be movable from a closed position to an opened position.

The present invention is particularly well suited for closing the discharge opening of the dump body of refuse vehicles. Refuse vehicles are traditionally formed with closed refuse containing bodies, that is, they are incorporated with a roof, floor, side walls and front wall. The rear wall may be formed by a refuse compression apparatus which is movable out of the way to permit the refuse to be discharged when the dump body is tilted. Other vehicles have a compacting apparatus which is mounted in one of the side walls of the dump body. In these vehicles, it is necessary to provide doors and, perhaps, a tailgate in the rear wall which may be opended to permit the discharge of the contents of the body. Conventional vehicles include a pair of doors, each of which are adapted to close half of the discharge opening and each are hingedly connected along a vertical axis to the back end of the side walls of the vehicle dump body. During the dumping process, these doors must be kept open and out of the way and since most refuse vehicles tend to be rather large, this task tends to be difficult and a nuisance.

SUMMARY OF THE INVENTION

The present invention is intended to overcome the problem discussed above. In accordance with the present invention, a tailgate assembly, for a tiltable body of a truck, is movable between a closed and an opened position in response to angular displacement of the body and is comprised of first and second gate members, one of which is pivotally connected to the body, catch structure normally maintaining the assembly in the closed position and a biasing apparatus for moving the assembly towards the opened position.

The catch structure is in the form of two angle members each having a lug which cooperate with one another. One member is fixed to the body of the vehicle while the other is fixed to one of the gate members. When the dump body is in its normal lowered position the two lugs are interlocked and as a result the gate assembly cannot move relative to the body. However, once the body has undergone a predetermined angular displacement, the lugs disengage and the assembly is forced towards the opened position by the biasing apparatus.

The biasing apparatus takes the form of a plurality of links and springs. The links have one end pivotally connected to the body, and their other end connected to a spring. The spring is connected at its other end to the first gate member. The links are provided to reduce the biasing effect while the body is in its lowered position, and conversely, to increase the effect when the body is raised.

INTRODUCTION OF THE DRAWINGS

These and other details and advantages will become clear from the description of a preferred embodiment of the invention which follows, in which reference is made to the attached drawings wherein:

FIG. 1 is a partial side elevation of the tailgate assembly constructed in accordance with the present invention;

FIG. 2 is a rear elevation of the tailgate assembly;

FIG. 3 is an elevation similar to that of FIG. 1 but with the dump body angularly displaced from its normal position;

FIG. 4 is an elevation similar to that of FIG. 3; and

FIG. 5 is a perspective view showing the catch mechanism.

DETAILED DESCRIPTION

With reference now to FIGS. 1 and 2, there is shown a refuse vehicle dump body 10 mounted in a conventional manner on a truck frame 11 which is supported on rear axles and wheels 12. The dump body includes side walls 13 and roof 14. The sides and roof are joined, for purposes of illustration by a rear frame member 15. The frame member is box-shaped or tubular in cross-section and defines the opening 16 through which the refuse material, contained in dump body 10, is discharged.

The tailgate assembly 20 has been found particularly suited for use with dump bodies of the closed type described above. However, the assembly could also be adapted to be used in conjunction with conventional open dump bodies of the type which carry gravel, sand and the like. Accordingly, in the description which follows, the assembly must not be taken as being applicable only to the specific construction described, but, also, to any vehicular structure where such an arrangement may be usefully adapted.

Tailgate assembly 20 includes three gate sections or members, first, second, and third gate sections 21, 22, and 23, respectively. Gate section 23 is a conventional droptype tailgate pivoted, along one edge, on pins 25 which project outwardly of the sides of the vehicles and into suitable holes formed in lugs 26 welded, bolted, or otherwise fixed to dump body 10, as shown. Gate 23 is adapted to rotate on a horizontal axis determined by pins 25, from its upwardly disposed, closed position (shown in FIGS. 1 and 2) to a downwardly disposed, opened position (shown in FIGS. 3 and 4). Any suitable and conventional means may be used to hold gate 23 in its closed position.

It should be noted that gate 23 is not essential to the successful operation of the present invention, and may be dispensed with, using only gate sections 21 and 22. However, in practice, a gate similar to gate 23 has been found useful and accordingly, is included in the present description for this reason.

Gate members 21 and 22, as is gate member 23, are essentially rectangular in nature (FIG. 2) having peripheral tubular frame portions 30 and 31, respectively, to which there is fixed sheet metal plates of suitable strength to withstand the compression of the material within the body 10 induced by a loading bucket or blade (not shown). Together, the three gate sections close the discharge opening 16 of the dump body.

The first gate section, 21, is formed with a pair of vertical posts 33 which span and are welded to the peripheral frame 30. To each of these posts, there is connected, by bolts 34, hinge arms 35 of hinges 36. Apart from arms 35, each hinge includes a hinge bracket 37 fixed to dump body frame 15 by bolts 38. Pins 39 extend through and join arms 35 brackets 37 and define a first horizontal axis. It can be seen, then, that gate member 21 is capable of rotation on pins 39 from its position in FIG. 1 so that shown in FIG. 4, to open the discharge opening of body 10.

Gate member 22 is mounted for rotation about the lower horizontal edge of gate member 21 in the following manner. Peripheral frame 31 of gate 22 includes two horizontal members 41 joined at their ends by two vertical members 42. Similarly, frame 30, includes two horizontal members 43 and two vertical members 44. As shown in FIG. 5, along the upper end of each vertical member 42, there is fixed by bolts 46, a hinge and catch element 47. Each element 47 is comprised of a flat thin metal plate 48, which has, on one side of its upper end, a pin 50 fixed thereto. Pins 50 are adapted to be received in holes 51 formed in the ends of horizontal members 43 of frame 30, thereby, defining a second horizontal axis of rotation.

Gate 22 is further provided with abutments 45 which project downwardly therefrom (FIGS. 1 and 2) and are fixed to lower horizontal member 41. Abutments 45 are adapted to abut against the upper end of gate 23, when gates 22 and 23 are in their respective closed position, thereby preventing gate 22 from rotating about the pins 50.

On the side opposite pin 50 of each plate 48, there is provided a catch 55 which includes two L-shaped catch members 56 and 57, each having a lug 58 and 59, respectively which cooperate to hold gate assembly 20 in a closed position as will be described later. Member 56 is fixed by welding to frame 15 of dump body 10, and member 57 is fixed, also by welding to plate 48.

A biasing apparatus 60 is provided to maintain a continuous force on gate 21 tending to rotate the gate towards its opened position. Apparatus 60 includes a plurality of links 61 and springs 62. Links 61 each have one end connected to a pin 63 which extends through suitable holes in ears 64 of brackets 65 which in turn are fastened to frame 15 of body 10. The other end of each link 61 is connected to one end of a tension spring 62 which has its other end connected to a bracket 66 fixed to frame 30 of gate 21. Links 61 are preferably curved as shown in FIG. 1 so that the springs can be located as far inwardly of the vehicle as possible.

Springs 62 open gate 21 by virtue of the separation between the axis of pin 39 of hinge 36 and pin 63 of links 61. The springs are assembled in such a manner that they are subjected to a tensile force when gate 21 is held fast to the rear wall of the dump body by catch members 56 and 57. As best shown in FIG. 1, the line of force of springs 62 does not pass through the axis of pins 39 but rather is separated therefrom by a small distance so that a moment about the axis of pin 39 tending to open gate 21 is produced. When the vehicle body is tilted and lugs 58 and 59 are disengaged to permit gate 21 to pivot about pin 39, it will be seen that the separation between the line of force of spring 62 and the axis of pin 39 increases which, in turn, increases the moment about pin 39. This moment serves to open the gate to the position where the moment produced by the weight of the door equals that produced by the springs.

In view, then, the tailgate assembly 20 is comprised of three gate members, 21, 22 and 23, one of which, gate 21, is pivotally connected along a first horizontal axis to the vehicle body and a second of which is pivotally connected along a second horizontal axis to the first gate 21. The third gate, gate 23, is mounted for pivotal movement about a third horizontal axis defined by pins 25. The assembly 20 is prevented from opening or moving towards its opened position by a catch 55 and a biasing apparatus 60 applies a continuous force thereto tending to force the assembly towards the opened position.

The operation of the assembly will now be described with particular reference being made to FIGS. 1, 3 and 4. In the closed position the tailgate assembly is in the state shown in FIG. 1, with gate 23 abutting against abutments 45 to hold the lower end of gate 22 against frame 15 and lugs 58 and 59 of catch members 56 and 57, respectively, cooperating to prevent the hinge connection between gates 21 and 22 from buckling under the force of springs 62. When it is desired to discharge dump body 10, gate 23 is released and permitted to rotate about pins 25 to a lower, vertically disposed position illustrated in FIGS. 3 and 4. This frees the lower edge of gate 22 allowing it to pivot about pins 50. If, now, body 10 is pivoted about its pivot axis (not shown) in the conventional manner, gate 21 will remain in engagement with frame 15, as a result of cooperation between lugs 58 and 59, and gate 22 will remain in a vertically disposed position. This produces relative rotation between catch members 56 and 57. At a predetermined angular displacement of the body from its normal position which will be the same as that of gate 22 with respect to frame 15, lugs 58 and 59 will disengage and gates 21 and 22 will move to a position, away from body 10 and frame 15, where the force of springs 62 and the weight of the two gates exactly balance. Springs 62 can be adjustable so that the angular displacement between gate 21 and frame 15 can be made any desirable value, when the dump body is raised.

Once the material has been discharged, and the dump body 10 lowered, gate 22 is grasped and rotated sufficiently in a counterclockwise direction (FIG. 4) about pins 50 so that when pushed towards frame 15, lug 59 will clear lug 58. The gate is then released to permit lugs 58 and 59 to engage once again.

As previously mentioned, gate 23 is not essential. It can be removed, if gates 21 and 22 are made of greater height and means is provided to hold the lower end of gate 22 removably fixed to frame 15.

It will be appreciated that springs 62 could be attached to gate 22, in lieu of gate 21, this providing a force, in addition to the weight of gate 22, which will tend to rotate the gate about pins 50 when the dump body 10 is being raised. In this manner lugs 58 and 59 of catch 55 will be disengaged earlier allowing the assembly to open more quickly.

Further modifications and refinement can be made to the invention described above without departing from the spirit thereof defined by the appended claims which follow.

What I claim as my invention is:

1. A tailgate assembly, for a tiltable body of a truck, movable between opened and closed positions, comprising first and second gate members, means connecting at least one of said members to said body, means normally locking said assembly in a closed position, means biasing said assembly towards an opened position, said locking means being responsive to tilting of said body to permit said biasing means to move said assembly to said opened position and wherein said assembly further includes a third gate member pivotally connected at its lower edge to said body, said third gate member having its upper edge abutting the lower edge of said second gate member, and means for maintaining said third gate in a closed position.

2. The apparatus of claim 1, wherein said first member is pivotally connected to said body.

3. The apparatus of claim 1 wherein said second member is pivotally connected to said first member for relative rotation thereto.

4. The apparatus of claim 1, wherein said locking means includes first and second angle members, having cooperating and interengaging lugs, said first angle member being fixed to said body and said second member being fixed to one of said gate members.

5. The apparatus of claim 4, wherein said second angle member is fixed to said second gate member, and said lugs are engageable along the pivotal axis of a pivotal connection between said gate members.

6. The apparatus of claim 1, wherein said biasing means includes springs connected between said body and one of said gate members.

7. The apparatus of claim 6, wherein said biasing means further includes curved links each having one end pivotally connected to said body and the other end connected to one end of said springs.

8. A tailgate assembly, for a tiltable body of a truck, movable between closed and opened positions with relation to a discharge opening in said body, comprising first, second and third gate members, said first member being hingedly connected to said body along a first horizontal axis, said second member being hingedly connected to said first member along a second horizontal axis, and including abutments which cooperate with said third member to hold said second member against said body when said assembly is in said closed position, said third member being hingedly connected to said body along a third horizontal axis, catch means normally maintaining said assembly in a closed position, said catch means including first and second angle members each having a lug positioned for cooperation with one another, said second angle member being positioned along said second axis, said lugs being normally in engagement when said assembly is in said closed position, said first angle member being fixed to said body and said second angle member being fixed to said first member, means biasing said assembly towards said opened position, said biasing means including links each having one end pivotally connected to said body and the other end connected to one end of a spring, said springs having their other ends connected to said first gate member, whereby upon rotation of said third gate member about said third axis to release said second gate member and tilting of said body, said lugs will become disengaged from one another to allow said first and second gate members to move towards said opened position under the influence of said biasing means.

* * * * *